United States Patent
Wilson et al.

(10) Patent No.: US 8,702,974 B2
(45) Date of Patent: Apr. 22, 2014

(54) DESULPHURISATION PROCESS

(75) Inventors: Gordon Edward Wilson, Stockton-on-Tees (GB); Norman Macleod, Hartlepool (GB); Elaine Margaret Vass, Darlington (GB); Antonio Chica Lara, Valencia (ES); Avelino Corma Canos, Valencia (ES); Yonhy Saavedra Lopez, Valencia (ES)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 13/395,834

(22) PCT Filed: Sep. 2, 2010

(86) PCT No.: PCT/GB2010/051445
§ 371 (c)(1),
(2), (4) Date: May 24, 2012

(87) PCT Pub. No.: WO2011/033280
PCT Pub. Date: Mar. 24, 2011

(65) Prior Publication Data
US 2012/0232322 A1    Sep. 13, 2012

(30) Foreign Application Priority Data

Sep. 15, 2009    (GB) .................................. 0916161.3

(51) Int. Cl.
*C10G 45/06*    (2006.01)
*C10G 45/04*    (2006.01)

(52) U.S. Cl.
USPC ........ 208/217; 208/213; 208/244; 208/208 R; 585/820; 585/822; 585/841

(58) Field of Classification Search
CPC ...... C10G 45/00; C10G 17/00; C10G 25/003; C10G 45/04; C10G 45/06; C10G 2300/207; C10G 45/02
USPC ............. 208/208 R, 209, 212–214, 217, 237, 208/238, 244, 264, 299, 300, 303; 585/820, 585/823, 824, 833, 841, 868, 850
See application file for complete search history.

(56) References Cited

U.S. PATENT DOCUMENTS

| | | | |
|---|---|---|---|
| 3,551,124 A | 12/1970 | Iwaki et al. | |
| 5,130,115 A | 7/1992 | Fujisou et al. | |
| 5,685,890 A * | 11/1997 | Okada et al. | 48/214 A |
| 5,800,798 A | 9/1998 | Ino et al. | |
| 6,693,056 B1 * | 2/2004 | Birke et al. | 502/34 |
| 2009/0071876 A1 * | 3/2009 | Masuda et al. | 208/226 |

FOREIGN PATENT DOCUMENTS

| | | |
|---|---|---|
| CN | 1384770 A | 12/2002 |
| EP | 0 320 979 A2 | 6/1989 |
| EP | 1 192 981 A1 | 4/2002 |
| GB | 1 578 270 | 11/1980 |
| JP | 11-335101 | 12/1999 |
| WO | WO-97/05947 A1 | 2/1997 |
| WO | WO 01/32304 A1 | 5/2001 |
| WO | WO-2004/026465 A1 | 4/2004 |

OTHER PUBLICATIONS

International Search Report dated Dec. 20, 2010, from PCT International Application No. PCT/GB2010/051445.
Chinese OA for Application No. 201080040975.7 dated Dec. 4, 2013.

* cited by examiner

*Primary Examiner* — Walter D Griffin
*Assistant Examiner* — Jelitza Perez
(74) *Attorney, Agent, or Firm* — RatnerPrestia

(57) ABSTRACT

A process for desulphurizing hydrocarbons includes passing a mixture of hydrocarbon and hydrogen over a hydrodesulphurization catalyst to convert organosulphur compounds present in the hydrocarbon to hydrogen sulphide, passing the resulting mixture over a hydrogen sulphide sorbent including zinc oxide to reduce the hydrogen sulphide content of the mixture, and passing the hydrogen sulphide-depleted mixture over a further desulphurization material. The further desulphurization material includes one or more nickel compounds, a zinc oxide support material, and optionally one or more promoter metal compounds of iron, cobalt, copper and precious metals. The desulphurization material has a nickel content in the range 0.3 to 20% by weight and a promoter metal compound content in the range 0 to 10% by weight.

21 Claims, No Drawings

DESULPHURISATION PROCESS

CROSS-REFERENCE TO RELATED APPLICATIONS

This application is the U.S. National Phase application of PCT International Application No. PCT/GB2010/051445, filed Sep. 2, 2010, and claims priority of British Patent Application No. 0916161.3, filed Sep. 15, 2009, the disclosures of both of which are incorporated herein by reference in their entireties for all purposes.

FIELD OF THE INVENTION

This invention relates to desulphurisation processes and in particular deep desulphurisation processes intended to reduce sulphur compounds present in hydrocarbon feed to levels below 5 parts per billion by volume.

BACKGROUND OF THE INVENTION

Hydrocarbon feedstocks intended for use in synthesis gas generation must first be desulphurised in order to protect sensitive downstream catalysts from deactivation. Sulphur removal is conventionally carried out using a combination of hydrodesulphurisation (HDS) catalysis (based typically on CoMo or NiMo catalysts) followed by zinc oxide based absorbents. In this process, the HDS catalyst converts organosulphur species such as mercaptans and alkyl-sulphides in the feed to hydrogen sulphide, which may be subsequently removed, along with existent hydrogen sulphide, by reaction with the ZnO. In order for the hydrodesulphurisation reaction to occur, it is necessary to have hydrogen present in the feed, and this is often provided by recycling a portion of the synthesis gas or hydrogen generated downstream. Although this two-stage process can be effective, typically providing protection down to <100 ppbv sulphur, some sulphur slip will invariably still occur resulting in gradual deactivation of downstream catalysts. This is particularly problematic for pre-reforming and noble metal based steam-reforming catalysts, as these are highly susceptible to sulphur. Furthermore some sulphur compounds such as thiophene are resistant to hydrogenation over Co and Ni catalysts.

EP-A-0320979 discloses a process for steam reforming of hydrocarbons after desulfurizing the hydrocarbon to a sulfur content of 5 ppb or less using a three-stage process in which a mixture of hydrocarbon and hydrogen is firstly subjected to hydrodesulphurisation over a Ni—Mo or Co—Mo catalyst at 350-400° C., and secondly hydrogen sulphide absorption over a zinc oxide absorbent at a temperature in the range 250-400° C. Finally, the resulting mixture is passed over a copper-zinc desulphurisation material formed by co-precipitating copper and zinc salts, optionally also in the presence of an aluminium salt, with an alkaline material, drying and calcining the precipitate, and then reducing the calcined material with a hydrogen/nitrogen gas mixture.

EP-A-1192981 discloses a desulphurisation material comprising copper, zinc oxide, alumina and iron or nickel compounds, formed by co-precipitating copper and zinc compounds with an alkali substance, drying and calcining the precipitate, shaping the oxidic material, impregnating the shaped material with iron and/or nickel compounds, calcining the impregnated material to convert the iron or nickel compounds to their oxides and then reducing the material with hydrogen. The desulphurisation materials disclosed contained in the region of 40% wt copper and 1 to 10% wt iron and/or nickel.

The desulphurisation material preparation procedures described above are complex and the latter requires two calcination steps, which add considerably to the manufacturing cost.

In practice, the copper-zinc desulphurisation materials are generally provided as the calcined oxidic materials, which are reduced to their active form in-situ. The high copper content in the desulphurisation materials, which is typically over 30% by weight expressed as copper oxide, leads to lengthy and cumbersome procedures due to the highly exothermic nature of the copper oxide reduction. Furthermore, although these products are able to remove residual sulphur species for a limited period, their effectiveness diminishes significantly with time on line. They also suffer from low ultimate sulphur capacity and a maximum of about 1 wt % S is typical. Moreover there is a desire to reduce the metal content in such materials while retaining their effectiveness and also to simplify the production route to reduce cost. However the products need to maintain their effectiveness and possess suitable physical properties such as crush strength in order to be effective replacements.

SUMMARY OF THE INVENTION

We have found that shaped compositions comprising nickel and zinc compounds are effective desulphurisation materials in processes for producing hydrocarbon streams with <5 ppb sulphur.

Accordingly the invention provides a process for desulphurising hydrocarbons comprising the steps of;
  (i) passing a mixture of hydrocarbon and hydrogen over a hydrodesulphurisation catalyst to convert organosulphur compounds present in said hydrocarbon to hydrogen sulphide,
  (ii) passing the resulting mixture over a hydrogen sulphide sorbent comprising zinc oxide to reduce the hydrogen sulphide content of the mixture and
  (iii) passing the hydrogen sulphide-depleted gas mixture over a further desulphurisation material,
wherein the further desulphurisation material comprises one or more nickel compounds, a zinc oxide support material, and optionally one or more promoter metal compounds selected from compounds of iron, cobalt, copper and precious metals, said desulphurisation material having a nickel content in the range 0.3 to 20% by weight and a promoter metal content in the range 0 to 10% by weight.

DETAILED DESCRIPTION OF THE INVENTION

The hydrocarbon may be any hydrocarbon used for reforming and includes natural gas, refinery off-gases, associated gas, natural gas condensates, ethane, propane, butane, liquefied petroleum gas, light naphtha, heavy naphtha, kerosene, gas oil, coke oven gas, and town (coal) gas.

The sulphur content in the hydrocarbon may be above 2 ppm and may be 10 ppm volume or higher. The process may be used with feeds having up to about 500 ppm sulphur. The desulphurisation process according to the process of the present invention is able to remove a wide range of sulphur compounds including hydrogen sulphide, carbonyl sulphide, carbon disulphide, mercaptans such as t-butyl mercaptan, dialkyl sulphides such as dimethyl sulphide, cyclic sulphides such as tetrahydrothiophene, dialkyl disulphides such as diethyl disulphide and thiophenic species.

The process of the present invention is capable of providing hydrocarbon feeds having <5 ppb, preferably <2 ppb, more preferably <1 ppb volume, most preferably <0.1 ppb volume.

The hydrogen content of the hydrocarbon/hydrogen mixture is desirably in the range 1 to 30% by volume depending on the hydrocarbon. For example plants operating on natural gas may use an inlet hydrogen content of 2-5% whereas plants using naphtha may require an inlet hydrogen content about 25% by volume.

The hydrodesulphurisation (HDS) catalyst may be any conventional hydrogenation catalyst such as the supported or precipitated hydrodesulphurisation catalysts. Preferably the hydrodesulphurisation catalyst is selected from a Ni—Mo, Co—Mo, Ni—W or Co—W catalyst, more preferably a Ni—Mo or Co—Mo catalyst. Suitable HDS catalysts are commercially available, for example as KATALCO$_{JM}$ 61-1T and KATALCO$_{JM}$ 41-6T available from Johnson Matthey PLC.

Conventional HDS conditions may be used. For example the mixture of hydrocarbon and hydrogen may be passed over a fixed bed of the particulate HDS catalyst at a temperature in the range 350-400° C. a pressure in the range 1 to 50 barg and a gas hourly space velocity up to about 10,000 hr$^{-1}$. The resulting gas mixture may then be passed directly, i.e. In the same vessel over a bed of the hydrogen sulphide sorbent comprising a zinc oxide material. The inlet temperature for the hydrogen sulphide sorbent may be in the range 250-400° C. The GHSV over the hydrogen sulphide sorbent may be 1000 hr$^{-1}$ or higher.

The hydrogen sulphide sorbent may be any conventional zinc oxide sorbent material. Such materials generally comprise powdered zinc oxide in pellet, extrudate or granule form held together with a suitable binder. Such materials are commercially available for example as KATALCO$_{JM}$ 32-4 and KATALCO$_{JM}$ 32-5 available from Johnson Matthey PLC.

The sulphur content of the mixed gas after it has passed over the hydrodesulphurisation catalysts and hydrogen sulphide sorbent is preferably below 1 ppm, more preferably below 0.1 ppm volume.

The inlet temperature for the further desulphurisation material, which may be in the same or a different vessel downstream of the hydrodesulphurisation catalyst and hydrogen sulphide sorbent, is desirably in the range 200-400° C. The GHSV over the further desulphurisation material comprising one or more nickel compounds and zinc oxide may be 1000 hr$^{-1}$ or higher.

The nickel compound in the further desulphurisation material may be selected from the group consisting of nickel metal, nickel nitrate, nickel acetate, nickel oxide, nickel hydroxide, and nickel hydroxycarbonate. The nickel compound used in the preparation of the material may be the same or different to that in the final material. In one embodiment, a nickel hydroxycarbonate is combined with the other components and the resulting mixture calcined to provide the material with the nickel in the form of nickel oxide. Whether the nickel is in the form of nickel oxide or another nickel compound, in use, the material will be usually exposed to a reducing gas stream such that the nickel compound will be reduced to nickel metal. The amount of nickel compound present in the material in a reduced or unreduced state is such that the nickel content in the desulphurisation material is in the range 0.3 to 20% by weight, preferably 0.5 to 10% by weight, more preferably 0.7 to 7.5% by weight.

The desulphurisation material may optionally further comprise one or more promoter metal compounds. The promoter metal content is present in the range 0 to 10% by weight such that the maximum nickel and promoter content of the desulphurisation material, being the sum of the active, reducible metals, is 30% by weight. However lower metal levels are preferred such that the combined nickel and promoter metal content is preferably ≤20% by weight, more preferably ≤15% by weight. The desulphurisation materials of the present invention therefore offer considerable metal savings compared to the Cu-based compositions.

Promoter metals include iron, cobalt, precious metals (ruthenium, rhodium, iridium, palladium and platinum) and copper. A preferred promoter metal is copper. Copper promoter metal compounds may be selected from copper metal, copper nitrate, copper acetate, copper oxide, copper hydroxide and copper hydroxycarbonate. As with the nickel compound, the promoter metal compound used in the preparation of the material may, if present, be the same or different to that in the final material.

In one embodiment, a copper hydroxycarbonate is combined with the other components and the resulting mixture calcined to provide a material with the copper in the form of copper oxide. Whether the copper is in the form of copper oxide or another copper compound, in use, the material will be usually exposed to a reducing gas stream such that any copper compound in use will be reduced to copper metal. The amount of copper compound present is preferably such that the copper content of the desulphurisation material is in the range 0.3 to 10% by weight, more preferably 0.7 to 7.5% by weight. Where copper is included, the molar ratio of Ni:Cu in the desulphurisation material is preferably in the range 0.8 to 1.2:1.

The zinc oxide support material may be selected from zinc oxide, a zinc oxide/alumina mixture or a zinc-alumina hydrotalcite. The ZnO content is preferably ≥55% wt, more preferably ≥75% wt, especially ≥80% wt in the desulphurisation material. Other support materials such as alumina or silica may be present.

It is believed that the Ni and promoter metal components catalyse hydrogenation of any remaining organo-sulphur species in the feed, whilst the ZnO absorbs the hydrogen sulphide produced (by reaction to form ZnS). However we have found catalysts without copper surprisingly to be as effective as the copper-containing materials.

Although such nickel-based materials are effective in the removal of sulphur species from hydrocarbon feedstocks, their applicability may be restricted by the fact that they can also catalyse hydrocarbon hydrogenolysis, an undesirable exothermic side reaction that can result in significant over-temperatures being developed in the catalyst bed. In addition, the reaction also consumes valuable hydrogen.

It has been found that alkaline metal compounds are able to suppress the hydrogenolysis reaction without significantly reducing the hydrogenation and sulphur absorption capacity of Ni compound-zinc oxide desulphurisation materials. In cases where hydrogenolysis may be a problem, it may be desirable therefore that the desulphurisation material further comprises an alkaline compound, which may be a compound of sodium, potassium, caesium, magnesium, calcium or barium compound. Preferably, the alkaline metal compound is an oxide, carbonate or hydrogen carbonate. More preferably the alkaline compound is sodium oxide or sodium carbonate. The amount of alkaline metal compound present in the desulphurisation material may be in the range 0 to 10% by weight, preferably 0.2 to 5% by weight.

In a preferred embodiment, the desulphurisation material comprises 0.5-10% by weight nickel, 0-10% by weight copper, 0-15% by weight $Al_2O_3$, 0-10% by weight alkaline metal compound and 55-98% by weight ZnO. Small amounts of binder material, typically 0.5-10% wt, may also be present.

The desulphurisation material comprising one or more nickel compounds and zinc oxide may be prepared using known methods. Thus the desulphurisation material may be prepared by impregnating a shaped zinc oxide material with a solution of one or more soluble nickel compounds followed by drying and optionally calcination to convert the nickel compound to nickel oxide. Promoter metal compounds may be applied simultaneously or sequentially in any order to the zinc oxide material. Alternatively, a nickel-zinc-aluminium composition may be formed by co-precipitation of suitable soluble nickel and zinc salts from solution using a suitable precipitant, such as an alkali metal hydroxide and/or carbonate solution, followed by washing, drying and optional calcination to covert the nickel and zinc compounds to their oxides. Promoter metal compounds and/or aluminium compounds may be included in the zinc and/or nickel solution to form a Ni-promoter metal-Zn—Al composition. The dried and/or calcined co-precipitate may then be shaped.

However impregnation and co-precipitation methods require multiple step handling of liquids and can create effluent disposal problems. We have found surprisingly that sorbents with acceptable physical properties for this duty may be prepared by relatively 'dry' methods. Thus preferably the further desulphurisation material comprises a shaped mixture of one or more particulate nickel compounds, a particulate zinc oxide support material and optionally one or more particulate promoter metal compounds. The particulate compounds are suitably oxides, hydroxides, carbonates and basic carbonates. In a preferred embodiment, the desulphurisation material is prepared from a mixture of particulate nickel and zinc compounds that is shaped using conventional means such as pelleting, granulation or extrusion followed by drying and optionally calcination. Additionally, one or more promoter metal compounds may also be included in the mixture such that the further desulphurisation material comprises a shaped mixture of one or more particulate nickel compounds, one or more particulate promoter metal compounds and a zinc oxide support material. Binders and/or lubricants typically used in the preparation of extruded, pelleted and granulated materials may also be included. Preferably the desulphurisation material is prepared by granulation. In this technique, powdered nickel compound, zinc oxide support material, a suitable binder such as calcium aluminate, and optionally a powdered promoter metal compound and/or an additional alkaline metal compound, are mixed in the presence of a small amount of water in order to form roughly spherical agglomerates with diameters in the range 1-10 mm. The granulated materials are dried and may be calcined to form the desulphurisation material in oxidic form.

Hence the method of making a desulphurisation material according to the present invention may comprise the steps of:
(i) mixing a powdered nickel compound with a particulate zinc oxide support material, a binder material and optionally a powdered promoter metal compound and/or an alkaline metal compound, in the presence of water to form a wet composition,
(ii) shaping the wet composition, and
(iii) drying and calcining the shaped wet composition.

In this case, the shaping may be the act of granulation itself, or may be the separate pelleting or extrusion of the material through shaped dies according to methods known to those skilled in the art. Hence the desulphurisation material may be in the form of shaped units such as spheres, pellets, cylinders, rings, or multi-holed pellets, which may be multi-lobed or fluted, e.g. of cloverleaf cross-section.

Drying and calcining may be performed in one or two stages. Drying is typically performed at 40-120° C. Calcination may be performed at 250° C.-750° C. for up to 24 hours, but is preferably performed at 250-550° C. over 1-10 hours.

Prior to use, to render the desulphurisation material active, the Ni component (and promoter metal component if present) should be reduced in a reducing gas stream in order to convert the Ni (and promoter metal if present) to elemental form. Reduction may be performed on the dried or the calcined materials.

Reduced catalysts can self-heat through the exothermic reaction of the highly reactive metal surfaces with oxygen. Hence in one embodiment, the desulphurisation material may be provided to the customer in oxidic form and the nickel compounds and promoter metal compounds (if present) reduced to elemental form by reaction with a hydrogen-containing gaseous mixture, e.g. a hydrogen/nitrogen mixture or the process feed mixture, in-situ in the desulphurising vessel.

In an alternative embodiment, the desulphurisation material may be provided to the process in pre-reduced and passivated form in which the desulphurisation material is first reduced ex-situ by treatment with a reducing gas, such as a hydrogen/nitrogen mixture, and the reduced metal surfaces passivated with an oxygen-containing gas, e.g. air in nitrogen. The passivation causes the formation of a thin layer of metal oxide/carbonate on the metal surface so that the material may be safely transported and installed. Again, once installed, the process gas or another hydrogen containing gas may be used to reduce the passivating layer and provide the active material in-situ.

In both cases, known methods for causing reduction of the Ni and promoter metal components may be used. The reducing gas stream may be any hydrogen-containing gas stream such as a 1-5% $H_2$ gas mixture e.g. a 2% hydrogen/nitrogen stream. Preferably, the desulphurisation material is activated in-situ using the process fluid to be desulphurised, where it contains hydrogen and/or carbon monoxide. The activation is normally performed at elevated temperature, for example in the range 250 to 500° C. and pressure in the range 1 to 100 bar abs.

Ex-situ reduction may be carried out using a hydrogen-containing gas stream, such as a 2% hydrogen/nitrogen stream under the same conditions. Passivation may be generally carried our with air/nitrogen mixtures or $CO_2$/air/nitrogen mixtures in which the oxygen content of the passivating gas mixture is gradually increased from about 0.1% to that of air over an extended period.

The desulphurised hydrocarbon may be used in a steam reforming process. Thus the invention includes a process for reforming a hydrocarbon feed comprising the steps of subjecting a mixture of hydrocarbon and hydrogen to a desulphurisation process according to the present invention to reduce the sulphur content to <5 ppb volume, and then passing the desulphurised hydrocarbon and steam over a steam reforming catalyst at elevated temperature & pressure to form a reformed gas stream comprising hydrogen and carbon oxides.

The reforming process may be adiabatic steam reforming over a Ni or precious metal catalyst, including so-called pre-reforming processes, or may be conventional steam reforming in which a mixture of the desulphurised hydrocarbon and steam are passed over supported Ni and/or precious metal catalysts in externally-heated tubes in a fired or gas heated reformer. The desulphurised hydrocarbon stream may also be autothermally reformed in an autothermal reformer. In each case, the feed is typically compressed to a pressure in the range 10-100 bar abs, preferably 20-60 bar abs. In pre-reforming a mixture of desulphurised hydrocarbon and steam are heated, typically to a temperature in the range 350-650° C., preferably 400-650° C., and then passed adiabatically through a bed of a suitable catalyst, usually a supported nickel catalyst having a high nickel content, for example above 40% by weight. In steam reforming, a mixture of desulphurised hydrocarbon and steam are passed through externally heated catalyst filled tubes with an exit temperature desirably in the range 650-850° C. The heating medium may be a combusting fuel or at least a portion of the reformed gas that has been subjected to further processing including a stage of partial combustion with an oxygen-containing gas to raise its temperature. Such further processing preferably comprises a secondary reforming step in which the partially combusted gas is passed through a bed of steam reforming catalyst. Heat exchange reformers and processes of this type are described in GB 1 578 270 and WO 97/05 947. In autothermal reforming, which is akin to secondary reforming, a desulphurised hydrocarbon stream, optionally with added steam, is fed to burner apparatus disposed near the top of the autothermal reformer, where it is partially combusted with an oxygen-containing gas, often oxygen (which may further comprise some steam), and the partially combusted gas mixture passed through a bed of steam reforming catalyst disposed beneath the burner. The heat generated by the partial combustion drives the steam reforming reactions forward. The exit temperature from the autothermal reformer may be in the range 800-1050° C.

In each case, it may be desirable to recycle a portion of the reformed gas mixture such that a portion of the reformed gas stream comprising hydrogen is used as the source of hydrogen for the hydrodesulphurisation step.

EXAMPLES

The invention will now be further described by reference to the following examples.

Example 1

Cu/Zn/Alumina Co-Precipitate Desulphurisation Material (Comparative)

A bed of a conventional co-precipitated Cu/Zn/alumina desulphurisation material (PURASPEC$_{JM}$ 2084) in the form of a powder with a particle size in the range 250-710 μm, having a copper oxide content of 62% wt, (expressed as CuO) was reduced in situ by the following method. The bed was initially heated to 180° C. in a flow of nitrogen (GHSV 10,000 Nm$^3$/m$^3$/hr$^{-1}$) and then hydrogen at a concentration of 1% was introduced and the temperature raised to 350° C. over a period of 3 hrs. These conditions were then maintained for a period of 60 hrs. An accelerated desulphurisation test was subsequently carried out with a feed composed of 2.7% hydrogen and 1500 vppb each of COS (carbonyl sulphide), DMS (dimethyl sulphide) and thiophene in natural gas at a GHSV of 7600 Nm$^3$/m$^3$/hr$^{-1}$ being directed through the preactivated bed of desulphurisation material. The process conditions were 350° C. and 35 barg over the course of the desulphurisation test, which lasting 50 days in total.

Under these conditions the conventional Cu/Zn/alumina product was able to remove H$_2$S (to less than 3 vppb) and COS (to less than 2 vppb) throughout the entire run. However the material was not effective in removing DMS and thiophene. The DMS level remained below 2 vppb until day 28 when initial breakthrough was observed. Over the remaining 22 days of the test, up to end of run (EOR) on day 50, the exit DMS level gradually increased to 16 vppb. In the case of thiophene, breakthrough was observed at 10 vppb on day 10. Over the remaining 40 days of the test the exit thiophene concentration increased steadily to 1200 vppb at EOR.

Example 2

Ni/Cu/Zno Granulate Desulphurisation Material

To 100 parts by weight of a commercial particulate zinc oxide support material were added 7.0 parts of a calcium aluminate binder, 7.4 parts copper hydroxycarbonate and 9.0 parts nickel hydroxycarbonate. The resulting powder was thoroughly mixed and then granulated with appropriate water addition using an orbital planetary mixer. The produced granules were then sieved and the on-size fraction (2.8-4.75 mm) dried at 110° C. overnight and finally calcined at 300° C. for 2 hours. This material was subsequently crushed and sieved to yield a 250-710 μm size fraction for testing. The nominal NiO and CuO loadings in the finished product were both 5.0 wt %. An accelerated desulphurisation test was subsequently carried out on this material under conditions identical to those specified in Example 1.

Under these conditions the nickel containing material was able to remove H$_2$S (to less than 3 vppb) and COS (to less than 2 vppb) throughout the entire run. In addition, in this case the exit DMS level also remained below the detection limit throughout the entire test. With respect to thiophene, breakthrough was observed at 10 vppb on day 15. Over the remaining 40 days of the test the exit thiophene concentration increased steadily to 170 vppb at EOR.

The DMS and thiophene results for Examples 1 and 2 are summarised in Tables 1 & 2 below;

TABLE 1

DMS exit data

|  | GHSV (Nm$^3$/m$^3$/hr$^{-1}$) | Breakthrough point (days on line) | Breakthrough concentration (vppb) | Final concentration at EOR (vppb) |
|---|---|---|---|---|
| Example 1 | 7,600 | 28 | 2 | 16 |
| Example 2 | 7,600 | — | — | ND |

ND—not detected

TABLE 2

Thiophene exit data

|  | GHSV (Nm$^3$/m$^3$/hr$^{-1}$) | Breakthrough point (days on line | Breakthrough concentration (vppb) | Final concentration at EOR (vppb) |
|---|---|---|---|---|
| Example 1 | 7,600 | 10 | 10 | 1200 |
| Example 2 | 7,600 | 15 | 10 | 170 |

Example 3

Cu/Zn/Alumina Co-Precipitate Desulphurisation Material (Comparative)

A bed of a conventional 2.8-4.75 mm sized co-precipitated Cu/Zn/alumina desulphurisation material (PURASPEC$_{JM}$ 2084) having a copper oxide content of 62% wt, (expressed as CuO) was reduced in situ by the following method. The bed was initially heated to 160° C. in a flow of nitrogen (GHSV 4000 hr$^{-1}$) and then hydrogen at a concentration of 1% was introduced and the temperature raised to 200° C. over a period of 4 hrs. After a further 4 hrs the hydrogen concentration was raised to 3%. These conditions were then maintained for a period of 48 hrs. Finally the temperature was raised to 220° C. and again left for 48 hrs. Following this procedure the catalyst was heated to 343° C. and the desulphurisation test as outlined below was carried out.

A feed gas consisting of 2% hydrogen in natural gas was passed at 343° C., 35 barg and at a GHSV of 10,000 $Nm^3/m^3/hr^{-1}$ through the pre-activated bed of desulphurisation material. The total run time was 77 days. During this period various combinations and concentrations of sulphur compounds were added to the feed gas, as outlined in Table 3.

TABLE 3

| Run period | Inlet Sulphur concentration (vppb) | | | | | | |
|---|---|---|---|---|---|---|---|
| (days) | $H_2S$ | COS | DMS | TBM | THT | Thiophene | Total S |
| 1-20 | 600 | 210 | 100 | 100 | 100 | 0 | 1110 |
| 21-30 | 1300 | 600 | 250 | 250 | 250 | 0 | 2650 |
| 31-41 | 850 | 400 | 200 | 200 | 200 | 0 | 1850 |
| 42-77 | 850 | 350 | 150 | 0 | 0 | 140 | 1490 |

COS—carbonyl sulphide, DMS—dimethyl sulphide, TBM—tertiary butyl mercaptan, THT—tetrahydrothiophene.

Under these conditions the conventional Cu/Zn/alumina product was able to remove $H_2S$ and COS to below 2 vppb throughout the entire test. Likewise TBM and THT were also removed to below the detection limit during the periods in which these species were present in the feed. However the material was not effective in removing DMS or thiophene. The DMS level remained below 2 vppb until day 64 when initial breakthrough was observed. Over the remaining 13 days of the test, up to end of run (EOR) on day 77, the exit DMS level gradually increased to 5 vppb. In the case of thiophene, immediate breakthrough was observed at 13 vppb when this species was introduced on day 42. Over the remaining 25 days of the test the exit thiophene concentration increased steadily to 95 vppb at EOR.

Example 4

Ni/Cu/Zno Granulate Desulphurisation Material

The preparation details as outlined in Example 2 were repeated with the exception that in this case the on size fraction (2.8-4.75 mm) was used for evaluation. The nominal NiO and CuO loadings in the finished product were once again both 5.0 wt %.

The material was then tested under conditions identical to those outlined in Example 3. With this sample, quantitative removal of $H_2S$, COS, TBM and THT was obtained. In addition, the exit DMS level also remained below the detection limit throughout the entire test. Furthermore, full removal of thiophene was obtained at the point when this species was initially introduced (day 42). This quantitative removal was maintained up until day 56, when initial breakthrough was observed (2 vppb). Over the remaining 21 days of the test the thiophene breakthrough gradually increased to reach 22 vppb at EOR on day 77.

Example 5

Ni/Cu/Zno Granulate Desulphurisation Material

Example 4 was repeated with the exception that the product was tested at a higher space velocity of 15,000 $Nm^3/m^3/hr^{-1}$. Under these conditions with the nickel containing material, complete removal of $H_2S$, COS, TBM and THT was again obtained. DMS was also removed to below the detection limit over the entire test under these conditions. In respect of thiophene, when initially introduced on day 42, immediate breakthrough was observed at 16 vppb. Over the remaining 35 days of the test, the thiophene exit level increased gradually to reach 60 vppb at EOR.

The DMS and thiophene results for Examples 3, 4 & 5 are summarized below;

TABLE 4

| | DMS exit data | | | |
|---|---|---|---|---|
| | GHSV ($Nm^3/m^3/hr^{-1}$) | Breakthrough point (days on line) | Breakthrough concentration (vppb) | Final concentration at EOR (vppb) |
| Example 3 | 10,000 | 64 | 2 | 5 |
| Example 4 | 10,000 | — | — | ND |
| Example 5 | 15,000 | — | — | ND |

ND—not detected

TABLE 5

| | Thiophene exit data | | | |
|---|---|---|---|---|
| | GHSV ($Nm^3/m^3/hr^{-1}$) | Breakthrough point (days on line | Breakthrough concentration (vppb) | Final concentration at EOR (vppb) |
| Example 3 | 10,000 | 42 | 13 | 95 |
| Example 4 | 10,000 | 56 | 2 | 22 |
| Example 5 | 15,000 | 42 | 16 | 60 |

Example 6

Cu/Zn/Alumina Co-Precipitate Desulphurisation Material (Comparative)

A bed of a conventional co-precipitated Cu/Zn/alumina desulphurisation material (PURASPEC$_{JM}$ 2084) in the form of a powder with a particle size in the range 250-710 μm, having a copper oxide content of 62% wt, (expressed as CuO) was reduced in situ by the following method. The bed was initially heated to 180° C. in a flow of nitrogen (GHSV 10,000 $Nm^3/m^3/hr^{-1}$) and then hydrogen at a concentration of 1% was introduced and the temperature raised to 350° C. over a period of 3 hrs. These conditions were then maintained for a period of 24 hrs. An accelerated desulphurisation test was subsequently carried out with a feed composed of 2.7% hydrogen, 950 vppb COS (carbonyl sulphide), 900 vppb DMS (dimethyl sulphide) and 450 vppb thiophene in natural gas at a GHSV of 7600 $Nm^3/m^3/hr^1$ being directed through the pre-activated bed of desulphurisation material. Process conditions were 350° C. and 35 barg over the course of the desulphurisation test, which lasting 74 days in total. On day 25 of this test the sulphur compoundconcentrations were increased to 2000 vppb COS (carbonyl sulphide), 1750 vppb DMS (dimethyl sulphide) and 900 vppb thiophene.

Under these conditions the conventional Cu/Zn/alumina product was able to remove both $H_2S$ and COS to below the detection limit throughout the entire run. However the material was not effective in removing DMS and thiophene. The DMS level remained below 2 vppb until day 56 when initial breakthrough was observed. Over the remaining 18 days of the test, up to end of run (EOR) on day 74, the exit DMS level gradually increased to 30 vppb. In the case of thiophene, breakthrough was observed at 6 vppb on day 26. Over the remaining 48 days of the test the exit thiophene concentration increased steadily to 780 vppb at EOR.

Example 7

Ni/Cu/Zno Granulate Desulphurisation Material

The preparation details as outlined in Example 2 were repeated. In this case a material with a size fraction size fraction 250-710 μm was used for evaluation. The nominal NiO and CuO loadings in the finished product were once again both 5.0 wt %.

Under these conditions the nickel containing material was able to remove $H_2S$ and COS to below the detection limit throughout the entire run. In addition, in this case the exit DMS level also remained below the detection limit throughout the entire test. With respect to thiophene, breakthrough was observed at 6 vppb on day 29. Over the remaining 45 days of the test the exit thiophene concentration increased steadily to 175 vppb at EOR.

Example 8

Ni/Zno Granulate Desulphurisation Material

To 100 parts by weight of a commercial particulate zinc oxide support material were added 7.0 parts of a calcium aluminate binder and 2.7 parts nickel hydroxycarbonate. The resulting powder was thoroughly mixed and then granulated with appropriate water addition using an orbital planetary mixer. The produced granules were then sieved and the on-size fraction (2.8-4.75 mm) dried at 110° C. overnight and finally calcined at 300° C. for 2 hours. This material was subsequently crushed and sieved to yield a 250-710 μm size fraction for testing. The nominal NiO loading in the finished product was 1.5 wt %. An accelerated desulphurisation test was subsequently carried out on this material under conditions identical to those specified in Example 6.

Under these conditions the nickel containing material was able to remove $H_2S$ and COS to below the detection limit throughout the entire run. In addition, in this case the exit DMS level also remained below the detection limit throughout the entire test. With respect to thiophene, breakthrough was observed at 6 vppb on day 29. Over the remaining 45 days of the test the exit thiophene concentration increased steadily to 95 vppb at EOR.

The DMS and thiophene results for Examples 6, 7 & 8 are summarized below;

TABLE 6

DMS exit data

| | GHSV (Nm³/m³/hr⁻¹) | Breakthrough point (days on line) | Breakthrough concentration (vppb) | Final concentration at EOR (vppb) |
|---|---|---|---|---|
| Example 6 | 7,600 | 56 | 5 | 30 |
| Example 7 | 7,600 | — | — | ND |
| Example 8 | 7,600 | — | — | ND |

ND—not detected

TABLE 7

Thiophene exit data

| | GHSV (Nm³/m³/hr⁻¹) | Breakthrough point (days on line) | Breakthrough concentration (vppb) | Final concentration at EOR (vppb) |
|---|---|---|---|---|
| Example 6 | 7,600 | 26 | 6 | 820 |
| Example 7 | 7,600 | 29 | 6 | 170 |
| Example 8 | 7,600 | 29 | 6 | 160 |

These results show that the Ni/ZnO desulphurisation material, despite the considerably lower reduced metal content was able to maintain low levels of sulphur breakthrough over a longer period than the conventional co-precipitated $Cu/ZnO/Al_2O_3$ based product. Even when tested at the higher GHSV of 15,000 hr⁻¹, the end-of-run performance of the Ni/ZnO granulated product was superior to the Cu/Zn/alumina material operating at 10,000 hr⁻¹. We submit it is surprising that even though the Ni/ZnO material contains significantly less active metal than the conventional material, it is still able to achieve the same very high purity requirements (<2 vppb S slip), under industrially relevant conditions, and furthermore can maintain this purity over a longer period.

Although the various reduction conditions used for the nickel containing materials in the examples above were identical to the conditions used in the corresponding Cu/Zn/alumina tests, in view of the lower Cu and Ni content of the former, it should be possible to reduce the material in the process of the present invention more quickly than the conventional material saving on both time and reducing gas.

The invention claimed is:

1. A process for desulphurising hydrocarbons comprising the steps of;
    (i) passing a mixture of hydrocarbon and hydrogen over a hydrodesulphurisation catalyst to convert organosulphur compounds present in said hydrocarbon to hydrogen sulphide,
    (ii) passing the resulting mixture over a hydrogen sulphide sorbent comprising zinc oxide to reduce the hydrogen sulphide content of the mixture, and
    (iii) passing the hydrogen sulphide-depleted gas mixture over a further desulphurisation material,
    wherein the further desulphurisation material comprises a shaped mixture of one or more particulate nickel compounds and a particulate zinc oxide support material, said desulphurisation material having a nickel content in the range 0.3 to 20% by weight, and
    wherein the particulate nickel compounds are neither impregnated on nor in the form of a co-precipitate with the particulate zinc oxide support material.

2. A process according to claim 1 wherein the hydrocarbon is selected from the group consisting of natural gas, refinery off-gas, associated gas, natural gas condensates, ethane, propane, butane, liquefied petroleum gas, light naphtha, heavy naphtha, kerosene, gas oil, coke oven gas, and town (coal) gas.

3. A process according to claim 1 wherein the hydrogen content of the hydrocarbon/hydrogen mixture is in the range 1 to 30% by volume.

4. A process according to claim 1 wherein the hydrodesulphurisation catalyst is selected from the group consisting of a Ni—Mo, Co—Mo, Ni—W and Co—W catalyst.

5. A process according to claim 1 wherein the hydrogen sulphide-depleted gas mixture is passed over the further desulphurisation material at a temperature in the range 200-400° C.

6. A process according to claim 1 wherein the further desulphurisation material comprises a promoter metal compound such that the promoter metal content of the desulphurisation material is in the range 0.3 to 10% by weight.

7. A process according to claim 1 wherein the nickel compound is selected from the group consisting of nickel oxide, nickel hydroxide, and nickel hydroxycarbonate.

8. A process according to claim 1 wherein the further desulphurisation material comprises one or more promoter metal compounds selected from compounds of copper.

9. A process according to claim 8 wherein the copper compound is selected from the group consisting of copper oxide, copper hydroxide, and copper hydroxycarbonate.

10. A process according to claim 1 wherein the zinc oxide support material is selected from the group consisting of zinc oxide and a zinc oxide/alumina mixture.

11. A process according to claim 1 wherein the further desulphurisation material further comprises an alkaline metal compound selected from the group consisting of an oxide, carbonate or hydrogen carbonate of sodium, potassium, caesium, magnesium, calcium and barium.

12. A process according to claim 1 wherein the desulphurisation material comprises 0.3 to 10% by weight nickel, 0 to 10% by weight copper, 0 to 15% by weight alumina, 0 to 10% by weight alkaline metal compound, 55 to 98% by weight ZnO and 0.5 to 10% wt binder material.

13. A process according to claim 1 wherein the further desulphurisation material comprises a shaped mixture of one or more particulate nickel compounds, a particulate zinc oxide support material, and optionally one or more particulate promoter metal compounds.

14. A process according to claim 1 wherein the desulphurisation material is provided in oxidic form and the nickel compound is reduced to elemental form by reaction with the hydrogen-containing gaseous mixture in-situ.

15. A process according to claim 1 wherein the desulphurisation material has been pre-reduced by treatment with a reducing gas and the reduced metal surfaces passivated with an oxygen-containing gas.

16. A process for reforming a hydrocarbon feed comprising the steps of subjecting a mixture of hydrocarbon and hydrogen to a desulphurisation process according to claim 1 to reduce the sulphur content to <5 ppb volume, and then passing a mixture of the desulphurised hydrocarbon and steam over a steam reforming catalyst at elevated temperature and pressure to form a reformed gas stream comprising hydrogen and carbon oxides.

17. A reforming process according to claim 16 wherein a portion of the reformed gas stream comprising hydrogen is used as the source of hydrogen for the hydrodesulphurisation step.

18. A process according to claim 1 wherein the further desulphurisation material comprises one or more promoter metal compounds selected from compounds of iron, cobalt, copper and precious metals.

19. A process according to claim 18 wherein a promoter metal content is 10% by weight or less.

20. A process according to claim 1 wherein the zinc oxide support material is prepared from a zinc-alumina hydrotalcite.

21. A process according to claim 1 wherein the further desulphurisation material is prepared by (i) mixing a powdered nickel compound with a particulate zinc oxide support material, a binder material and optionally a powdered promoter metal compound, and/or an alkaline metal compound, in the presence of water to form a wet composition, (ii) shaping the wet composition, and, (iii) drying and calcining the shaped wet composition.

* * * * *

UNITED STATES PATENT AND TRADEMARK OFFICE
CERTIFICATE OF CORRECTION

PATENT NO.        : 8,702,974 B2
APPLICATION NO.   : 13/395834
DATED             : April 22, 2014
INVENTOR(S)       : Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 15 days.

Signed and Sealed this

Twenty-ninth Day of September, 2015

Michelle K. Lee
*Director of the United States Patent and Trademark Office*